J. ECKHARD.
SIGHT FEED OILER FOR AUTOMOBILES.
APPLICATION FILED NOV. 29, 1909.
974,249.
Patented Nov. 1, 1910.
3 SHEETS—SHEET 1.
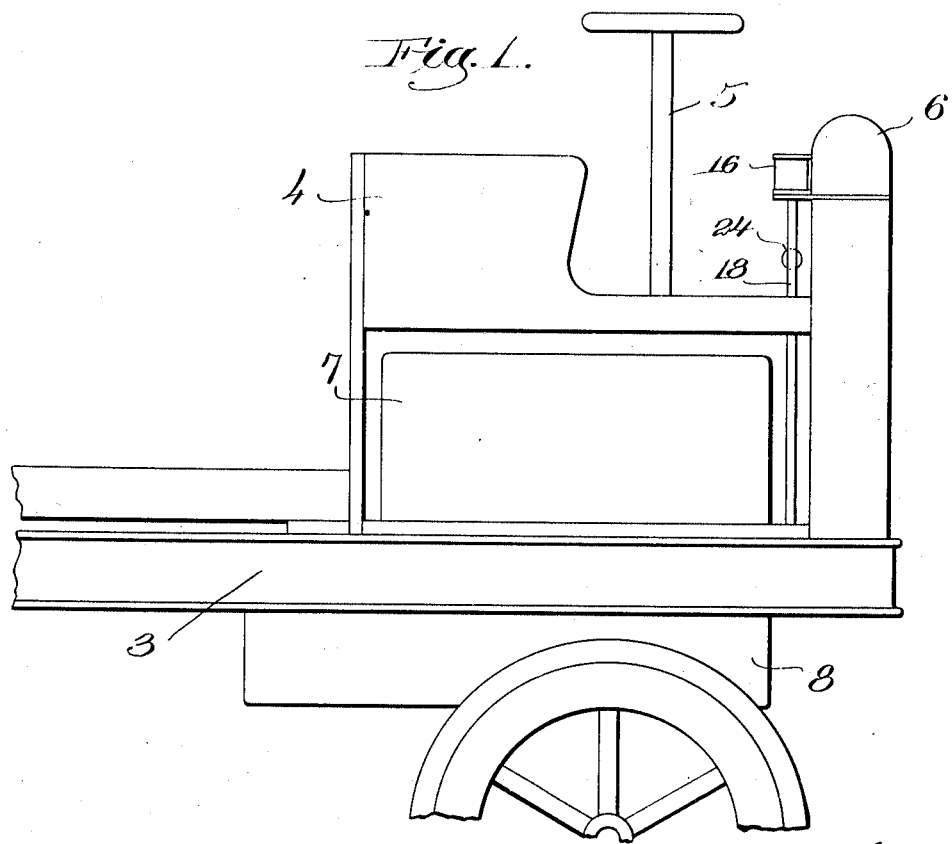
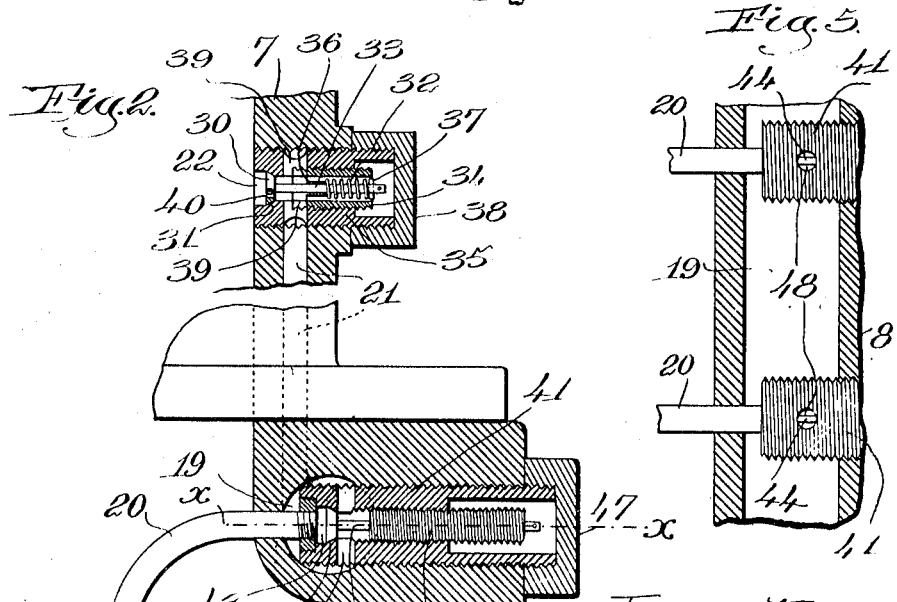

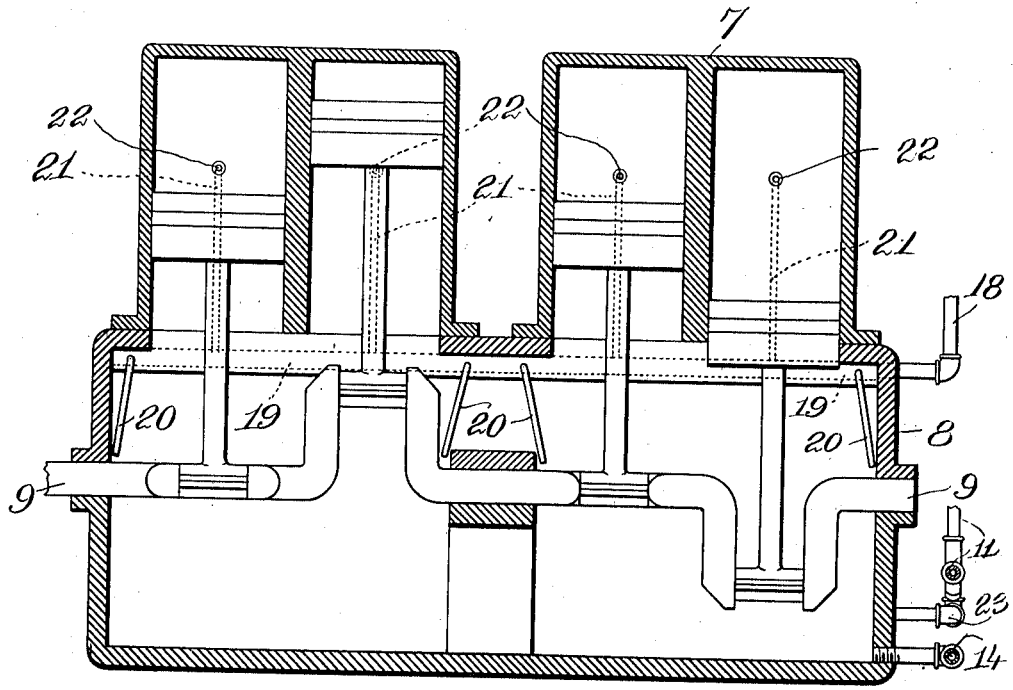

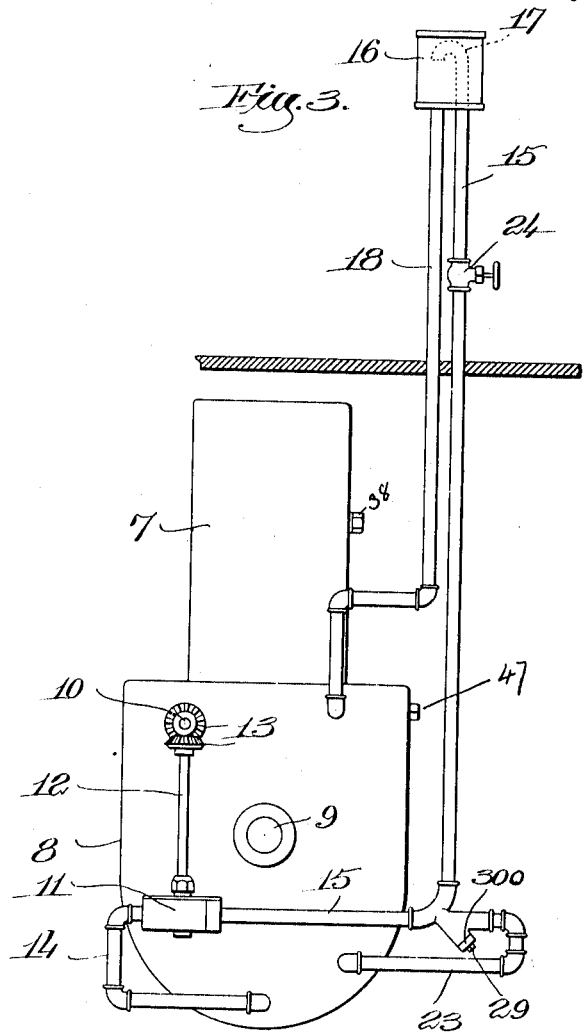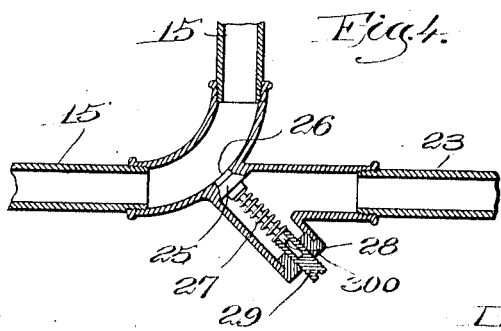

UNITED STATES PATENT OFFICE.

JOHN ECKHARD, OF BOSTON, MASSACHUSETTS.

SIGHT-FEED OILER FOR AUTOMOBILES.

974,249.  Specification of Letters Patent.  Patented Nov. 1, 1910.

Application filed November 29, 1909. Serial No. 530,350.

*To all whom it may concern:*

Be it known that I, JOHN ECKHARD, a citizen of the United States, residing at Boston, county of Suffolk, State of Massachusetts, and whose post-office address is No. 504 East Fourth street, South Boston, Massachusetts, have invented an Improvement in Sight-Feed Oilers for Automobiles, of which the following description, in connection with the accompanying drawing, is a specification, like characters on the drawing representing like parts.

This invention relates to sight feed oilers for automobiles and has for its principal object to provide a novel device of this character by means of which the oil will be delivered to the bearings in uniform quantities regardless of the speed of the engine.

I will first describe one embodiment of my invention and then point out the novel features thereof in the appended claims.

Figure 1 is a side view of the front part of an automobile truck to which my invention is applied; Fig. 2 is an enlarged sectional view through a portion of the cylinder and crank case; Fig. 3 is a front view of the engine and crank case showing the system of piping; Fig. 4 is a detail of the relief valve hereinafter described; Fig. 5 is a section on the line x—x, Fig. 2. Fig. 6 is a vertical section through the cylinders and crank case of the engine.

My improved oiling system may be applied to any automobile and for the purpose of illustrating it I have shown it herein as applied to an automobile truck.

In the drawings 3 designates generally the truck having the seat 4, the steering wheel 5 and the dash-board 6. The engine which drives the truck is shown generally at 7 and it has associated therewith the closed crank case 8. The crank shaft is shown at 9 and the cam shaft which operates the valves of the engine is shown at 10.

I have not attempted to show herein the details of the engine as it forms no part of the present invention, and my improved oiling system might be used with any engine.

The oiling system herein shown is adapted to oil both the bearings of the crank shaft and the pistons of the engine and it is similar to other oiling systems in that it is so arranged that the oil which accumulates in the bottom of the crank case is pumped through the system and is delivered to the bearings to be lubricated.

The pump is shown at 11 and it may be of any suitable type but will preferably be a gear pump which is operated by a shaft 12 that is driven from the cam shaft 10 by means of the bevel gears 13. A pipe 14 connects the pump with the bottom of the crank casing and another pipe 15 leads from the pump up to a sight oil feed 16 which is located where it can be readily seen by the driver of the automobile and may conveniently be secured to the dashboard 6. This sight oil feed comprises a glass casing into which the pipe 15 leads and the end of said pipe is provided with a goose-neck 17 so that the oil which is delivered from the pipe can be seen. The glass casing 16 has connected thereto another pipe 18 through which the oil is delivered to the bearings. This pipe 18 leads into a channel 19 formed in the wall of the crank casing and the channel has extending therefrom delivery pipes 20 that lead to the bearings that are to be lubricated. This channel 19, which extends the length of the crank case, has other channels 21 communicating therewith which extend upwardly through the walls of the cylinders of the engine 7 and each channel or duct 21 terminates in the discharge port 22 through which oil is delivered to the interior of the cylinder for lubricating the piston.

It will be evident that since the pump is operated by the engine, the pumping action will be faster or slower depending on the speed of the engine. It is, however, desirable that the amount of oil delivered to the bearing shall be substantially uniform regardless of the speed of the engine, for if the oil is delivered to the bearings too rapidly, the engine will smoke, while if not delivered rapidly enough the bearings are not sufficiently lubricated. In order to provide for a uniform delivery of oil regardless of the speed of the engine, I have provided a by-pass arrangement adapted to receive the surplus oil and return it to the crank casing, and I have arranged this by-pass so that it is brought into play only when oil is being delivered from the pump faster than it is needed for lubricating purposes. This by-pass is shown at 23 and one end connects to the pipe 15 on the delivery side of the pump and the other end connects to the crank case chamber. The pipe 15 has therein a valve 24 which controls the amount of oil delivered to the casing 16, and a spring-pressed relief valve is situated between the pipe 15 and the by-pass 23 so that when the pressure in the pipe 15 reaches a predetermined amount, the valve will open and admit the surplus oil to the by-pass. While this relief valve may have any suitable construction I have herein shown it at 25 as controlling a port 26 leading into the pipe 15 and as controlled by a spring 27 which tends to keep it seated. The valve is provided with a stem 28, the end of which plays in a recess formed in a plug 29, that is screw-threaded into the cap 300 and the spring 27 is confined between the plug and the valve and tends to keep the valve seated. It will be noticed that the valve opens outwardly and the spring 27 will be so adjusted by means of the plug 29 that the pressure required to open the valve will be somewhat more than that produced by the column of oil from the pump to the sight feed 16. The valve 24 will be set so that when the engine is worked normally sufficient oil will be pumped into the casing 16 to properly oil the bearings. Whenever the speed of the engine increases, the pump will obviously operate faster and as only a certain predetermined amount of oil can pass the valve 24 the pressure created in the pipe 15 below the valve 24 will open the relief valve 25 and permit the surplus oil to pass around into the by-pass 23.

My invention also comprehends a construction by which the oil will be supplied evenly to all of the bearings regardless of their position. It will be seen that the port 22 in the cylinder is situated above the duct 19 from which the pipes 20 are fed, and as a result when the pipe 18 is full of oil there will be a greater pressure in the duct 19 than at the port 22 so that if the port 22 should become clogged slightly the oil might not be delivered therefrom but would be delivered in too great quantities through the pipe 20. In order to provide for an even distribution of the oil, I provide each of the ports leading from the oil duct with spring-pressed valves which normally close the ports, but which will open only under a predetermined pressure. For instance, the port 22 is closed by a valve 30 which is held to its seat 31 by a spring 32. This valve has a stem 33 which extends through a sleeve 34 that is screw-threaded into a bushing 35 that in turn is supported in the side of the cylinder 7. The sleeve 34 has the spider 36 through which the stem 33 passes and against which one end of the spring 32 rests, the other end of the spring bearing against a pin or collar 37 carried by the valve stem. A cap 38 screws over the bushing 35 and closes the end thereof. The valve seat 31 is located between the end of the duct 21 and the port 22 and said sleeve is provided with ports 39 that afford communication between the port 22 and the duct 21. The purpose of the screw-threaded sleeve 34 is to permit of adjusting the tension of the spring 32, and this spring will be so set that the valve 30 will open only under predetermined pressure. This valve has a small leak port 40 through which oil will continually pass. A similar construction is used for controlling the delivery of oil to each pipe 20, that is, the wall of the crank case chamber has therein a screw-threaded bushing 41 formed at its inner end with a valve seat 42 against which a valve 43 seats, said valve having a stem 44 that extends through the sleeve 45 that is screw-threaded into the bushing. A spring similar to spring 32 serves to hold the valve to its seat and the tension of the spring may be adjusted by adjusting the sleeve 45. A cap 47 closes the outer end of the bushing 41, and said bushing is provided with ports 48 through which the oil is delivered from the duct 19. Each of the oil delivery ports will preferably be provided with a similar spring-pressed valve and the springs of the various valves will be adjusted so that they will open only under predetermined pressure. In this way the valves may be so adjusted that all of the valves will open simultaneously and there will, therefore, be no danger that the oil will flow too rapidly through any port. By removing either the cap 38 or the cap 47 the valve is made accessible either for the purpose of adjusting the spring, cleaning, repairing, or even to see if it is working.

Having fully described my invention, what I claim as new and desire to secure by Letters Patent is:—

1. In a sight-feed oiling system, the combination with an engine having bearings to be oiled and an inclosed crank case, of a sight feed, a pump operated by the engine, a pipe connecting the inlet of the pump to the crank case, another pipe connecting the outlet of the pump to the sight feed, a valve in said latter pipe to control the amount of oil delivered to the sight feed, a by-pass pipe connecting said latter pipe with the crank case and provided with a spring-controlled valve, and a pipe to deliver oil from the sight feed to the bearings.

2. In a device of the class described, the combination with an engine having a closed crank case and bearings to be oiled and also having a channel formed in the wall of the crank case and other channels communicating therewith and formed in the walls of the cylinder, said latter channels terminating in ports for delivering oil to the cylinder, of means to deliver oil to said channels, and an automatic valve controlling the supply of oil from the channel to each port.

3. In a device of the class described, the combination with an engine having a closed crank case and bearings to be oiled and also having a channel formed in the wall of the crank case and other chanels communicating therewith and formed in the walls of the cylinder, said latter channels terminating in ports for delivering oil to the cylinder, of means to deliver oil to said channels, and a spring-pressed valve controlling the supply of oil from the channel to each port and opening in the direction of the flow of the oil.

4. In a device of the class described, the combination with an engine having cylinders and a closed crank case and also having bearings to be oiled, said crank case having a channel formed in the walls thereof which runs longitudinally, and each cylinder having a channel formed in the wall thereof, which channel extends longitudinally of the cylinder and communicates with the first-named channel and also communicates with the interior of the cylinder, of means to deliver oil from the first-named channel to the bearings to be oiled, a sight feed communicating with said first-named channel, a pump connected with the crank case, a pipe connecting the pump to the sight feed, and a valve in said pipe.

5. In a sight feed oiling system, the combination with an engine having bearings to be oiled and an inclosing crank case, of a sight feed, a pump on the exterior of the crank case but connected thereto, a pipe conecting the outlet of the pump to the sight feed, a valve in said pipe to control the amount of oil delivered to the sight feed, a pipe to deliver oil from the sight feed to the bearings, and a by-pass provided with a spring-controlled valve to return surplus oil from the pump to the crank case.

In testimony whereof, I have signed my name to this specification, in the presence of two subscribing witnesses.

JOHN ECKHARD.

Witnesses:
 Louis C. Smith,
 Thomas J. Drummond.